Dec. 20, 1955 N. KULBERSH 2,727,304
BUMPER STRUCTURE FOR HEDGE SHEARS
Filed Nov. 30, 1954
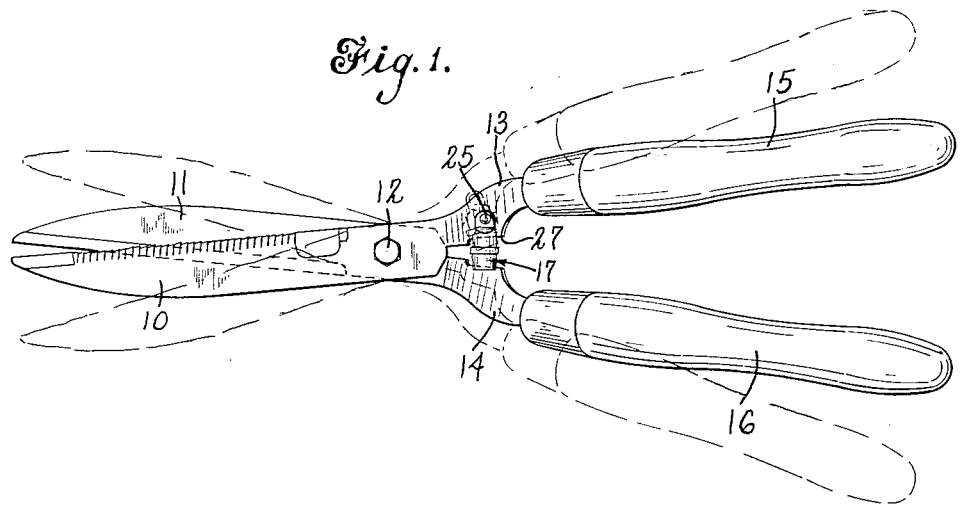
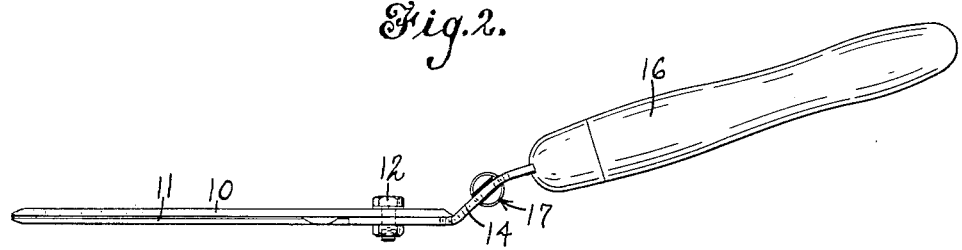
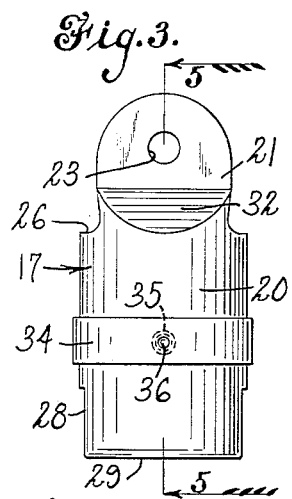
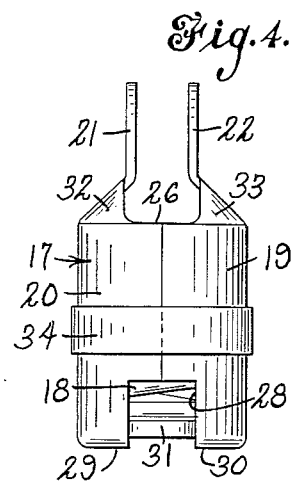
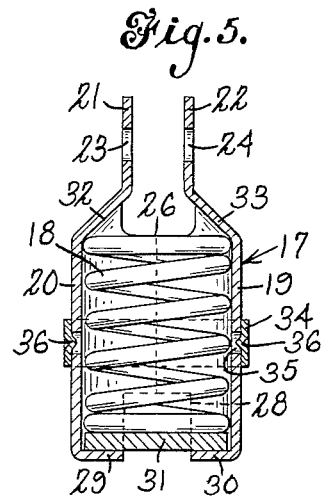
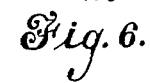
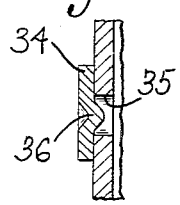
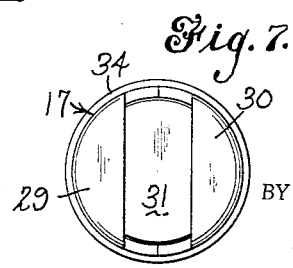
INVENTOR
Nathan Kulbersh
BY Rockwell & Bartholow
ATTORNEYS

United States Patent Office 2,727,304
Patented Dec. 20, 1955

2,727,304

BUMPER STRUCTURE FOR HEDGE SHEARS

Nathan Kulbersh, West Haven, Conn., assignor to Sargent & Company, New Haven, Conn., a corporation of Connecticut Application November 30, 1954, Serial No. 471,939

4 Claims. (Cl. 30—271)

This invention relates to hedge shears and more particularly to a shear having a pair of pivoted blades with handles connected to the blades to actuate the latter in opening and closing movements, and resides in a bumper or shock absorber interposed between the handles whereby the closing movement of the latter is cushioned and the handles urged apart to a slight extent so that the blades will normally stand in a slightly open position.

As shown, the invention is applied to a shear comprising a pair of blade members with integrally formed handles, the blade members being pivoted and the bumper or shock absorber arranged between the handles at a point rearwardly of the pivot.

The bumper or shock absorber comprises a cylindrical casing in which is housed a helical spring, the casing being formed of two substantially identical sections held together by novel and convenient means.

One object of the present invention is to provide a novel form of bumper or shock absorber for a hedge or similar shear.

A still further object of the invention is to provide a bumper or shock absorber between the handles of a hedge or similar shear, which shock absorber may be economically manufactured from parts which are readily assembled and which may be so secured to the handles of the shear that it will cushion their closing movement and normally held the handles in position so that the blades may be separated to a slight extent.

Still other objects of the invention are to provide a shock absorber for a hedge shear or the like consisting of a cylindrical casing formed by two identical halves conveniently secured together, the casing being provided at one end with ears or lugs by which it may be attached to one of the handle members of the shear and with a slot at the other end to permit the entry to some extent of the other handle member so as to cushion the closing of the handles at the end of their movement.

To these and other ends the invention consists in the novel features and combinations of parts to be hereinafter described and claimed.

In the accompanying drawings:

Fig. 1 is a top plan view of a hedge shear embodying my invention;

Fig. 2 is a side elevational view thereof;

Fig. 3 is a top plan view of the bumper or shock absorber mechanism alone;

Fig. 4 is a side view of the shock absorber mechanism shown in Fig. 3;

Fig. 5 is a sectional view on line 5—5 of Fig. 3;

Fig. 6 is an enlarged fragmentary sectional view showing the manner of securing the two halves of the casing of the shock absorber together; and Fig. 7 is an end elevational view of the shock absorber.

To illustrate a preferred embodiment of my invention I have shown in Fig. 1 of the drawings a hedge shear comprising a pair of blades 10 and 11 pivoted together by the pivot pin or bolt 12. Handle members 13 and 14 are provided to actuate the blades to open and closed position, these handle members, as shown, being formed integrally with the blades 10 and 11 respectively. It will be seen that the blades cross at the pivot so that when the handle members are moved toward each other or to closed position, the blades will also be closed to perform a cutting action.

Upon the handle members 13 and 14 are grip portions 15 and 16. These may be of the usual form and secured to the handle members in any preferred way so that a further description thereof is unnecessary.

Disposed between the handle members 13 and 14 is the shock absorber mechanism shown in Figs. 3 to 7. As illustrated this mechanism comprises a substantially cylindrical casing designated generally by the numeral 17 within which is housed a spring 18. The casing is preferably formed in two substantially identical halves 19 and 20, the main portion of these casing parts or sections being of semi-cylindrical shape so that when the two parts are abutted together along a plane passing through the axis of the casing, they will form a hollow cylindrical body to contain the spring 18.

Each of the sections 19 and 20 is provided at one end with a lug or ear, shown at 21 and 22, these lugs being provided with openings 23 and 24. When the casing parts are in assembled position, these lugs are spaced apart, as shown more particularly in Figs. 4 and 5, so that they will receive between them the inner edge of the handle member 13 and a rivet 25 may be passed through the openings 23 and 24 and through a registering opening in the handle member to secure the shock absorber to this member. It may also be noted from Figs. 3, 4 and 5, that the casing is provided with a shoulder 26 at each side which may rest against the edge 27 of the handle member 13 so as to relieve the rivet 25 from the shock of the closing of the blades and prevent the casing from turning about the rivet.

At the other end of the casing each of the members 19 and 20 is cut away adjacent its inner edge so that when the parts are assembled, there is provided a slot 28 opening through the end of the casing between end flanges 29 and 30. This slot is adapted to receive the inner edge of the handle member 14 when the handles are closed.

An abutment member in the form of a disk 31 is mounted loosely within the casing, the disk acting as an abutment for the spring 18 and being normally held against the flanges 29 and 30 by this spring. The other end of the spring abuts against the contracted portions 32 and 33 of the casing between the cylindrical portion thereof and the lugs 21 and 22.

The casing sections 19 and 20 are secured together by means of a ring 34 which embraces the casing snugly so as to hold the two parts thereof firmly together. In order to secure the ring in place after it has been assembled upon the casing, the latter is provided with diametrically opposite openings 35 into which a portion of the ring may be driven by a prick punch or similar tool, as shown at 36. This will hold the ring in place and hold the two parts of the casing in assembled relation so that the spring will be securely contained therein.

As shown, the shock-absorber mechanism is secured to one only of the handle members by the rivet 25. When the handles are in an open position, as shown in dotted lines in Fig. 1, the other handle 14 will be out of contact with the disk 31. However, when the handles are closed to close the blades, the inner edge of the handle 14 will enter the slot 28 and engage the abutment disk 31. A continued closing movement of the handle members will be resisted and cushioned by compression of the spring 18.

It may also be noted that as shown in Fig. 1 the parts are so proportioned that when the inner edge of the handle member 14 engages the abutment disk 31, the blades will be in a slightly open position, as shown in Fig. 1 to full lines. This is the position in which the blades will normally be held by the spring 18, and it will be found convenient for the blades to be normally held in this position in order that the operator may engage and cut a single branch or twig at the end of the shears without engaging surrounding foliage.

While I have shown and described a preferred embodiment of my invention, it will be understood that it is not to be limited to all of the details shown, but is capable of modification and variation within the spirit of the invention and within the scope of the claims.

What I claim is:

1. A hedge shear having a pair of blades pivoted together, handle members operatively connected at their forward ends to the blades, a shock-absorber structure disposed between the handle members rearwardly of the pivot of said blades, said shock-absorber structure comprising a hollow casing secured to the inner edge of one blade and having a slotted end facing the other blade to receive the edge thereof in said slot, and a coil spring in said casing to resist entry of the blade edge into the slot and urge the blades to a partial open position, said casing comprising a pair of substantially semi-cylindrical members placed together in abutting relation upon a plane passing through their axes and means securing said casing members together.

2. A hedge shear having a pair of blades pivoted together, handle members operatively connected at their forward ends to the blades, a shock-absorber structure disposed between the handle members rearwardly of the pivot of said blades, said shock-absorber structure comprising a hollow casing secured to the inner edge of one blade and having a slotted end facing the other blade to receive the edge thereof in said slot, and a coil spring in said casing to resist entry of the blade edge into the slot and urge the blades to a partial open position, said casing comprising a pair of substantially semi-cylindrical members placed together in abutting relation upon a plane passing through their axes, and a band snugly embracing said casing members to secure them together.

3. A hedge shear having a pair of blades pivoted together, handle members operatively connected at their forward ends to the blades, a shock-absorber structure disposed between the handle members rearwardly of the pivot of said blades, said shock-absorber structure comprising a hollow casing secured to the inner edge of one blade and having a slotted end facing the other blade to receive the edge thereof in said slot, a coil spring in said casing to resist entry of the blade edge into the slot and urge the blades to a partial open position, said casing comprising a pair of substantially semi-cylindrical members placed together in abutting relation upon a plane passing through their axes, and a band snugly embracing said casing members to secure them together, each of said casing members having an opening therein and the material of said band being displaced into said openings to hold the band in place.

4. A hedge shear having a pair of blades pivoted together, handle members operatively connected at their forward ends to the blades, a shock-absorber structure disposed between the handle members rearwardly of the pivot of said blades, said shock-absorber structure comprising a hollow casing secured to the inner edge of one blade and having a slotted end facing the other blade to receive the edge thereof in said slot, and a coil spring in said casing to resist entry of the blade edge into the slot and urge the blades to a partial open position, said casing comprising a pair of substantially semi-cylindrical members placed together in abutting relation upon a plane passing through their axes, each of said members having a securing lug at one end thereof and said lugs being spaced apart when said casing members are secured together to embrace the handle member and be secured thereto, said casing having a transverse slot at its other end with a flange at each side of said slot, and a washer in the casing abutting said flanges to receive the thrust of the spring.

References Cited in the file of this patent
UNITED STATES PATENTS

| | | |
|---|---|---|
| 365,455 | Windisch | June 28, 1887 |
| 553,954 | Cohoon | Feb. 4, 1896 |
| 1,741,109 | Heimerdinger | Dec. 24, 1929 |
| 1,822,591 | Hickok | Sept. 8, 1931 |
| 2,181,056 | Irvine | Nov. 21, 1939 |